July 1, 1958 J. C. TRAVILLA 2,841,097
RAILWAY TRUCK
Filed Feb. 24, 1953 3 Sheets-Sheet 1
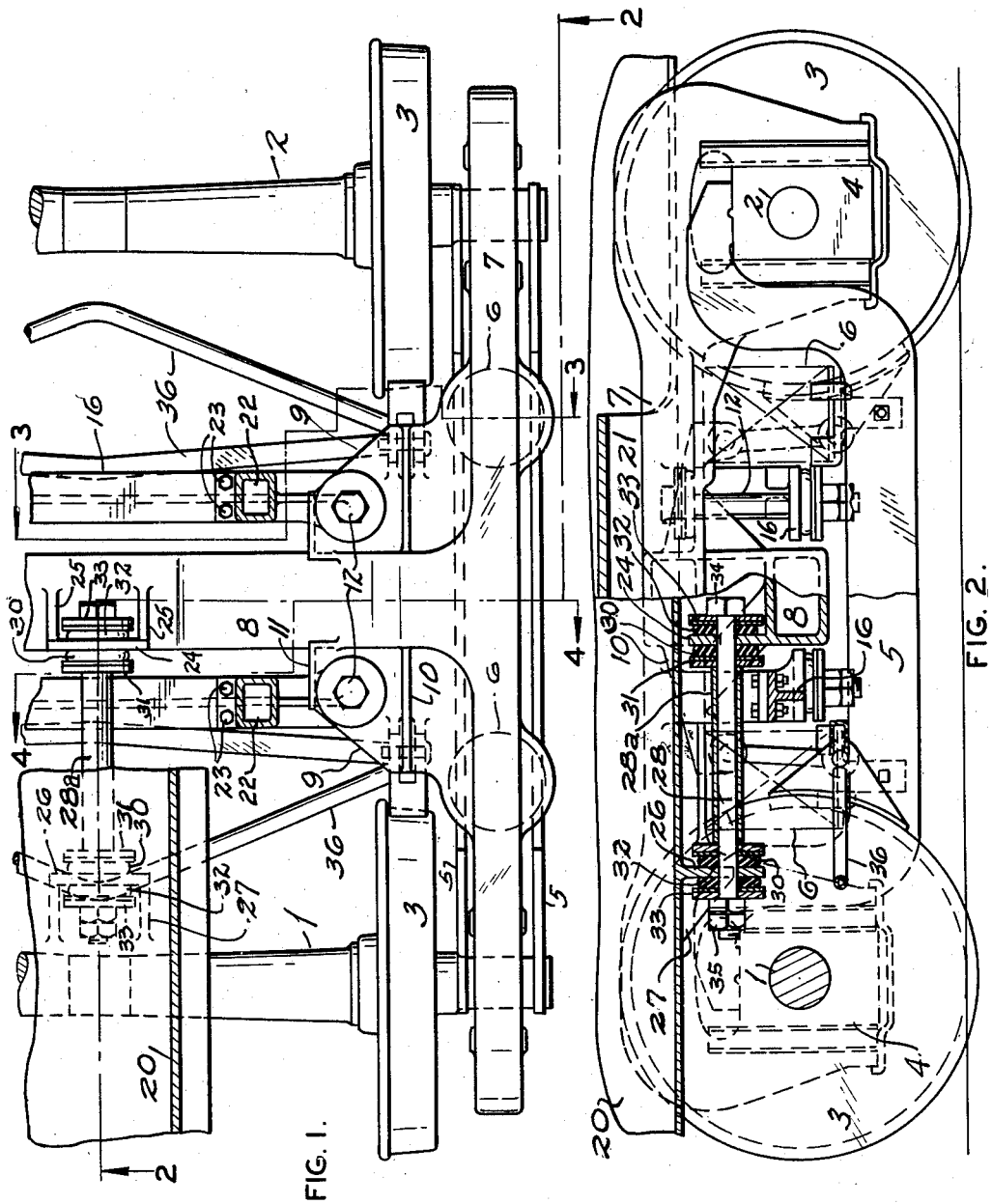
INVENTOR.
James C. Travilla
BY Rodney Bedell
atty.

July 1, 1958  J. C. TRAVILLA  2,841,097
RAILWAY TRUCK
Filed Feb. 24, 1953  3 Sheets-Sheet 2
FIG. 3.
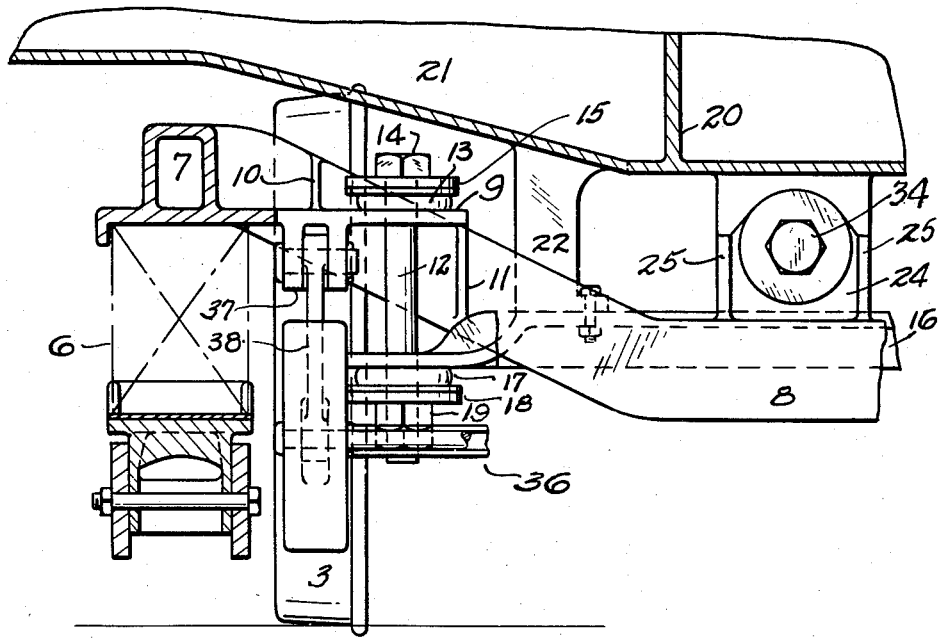
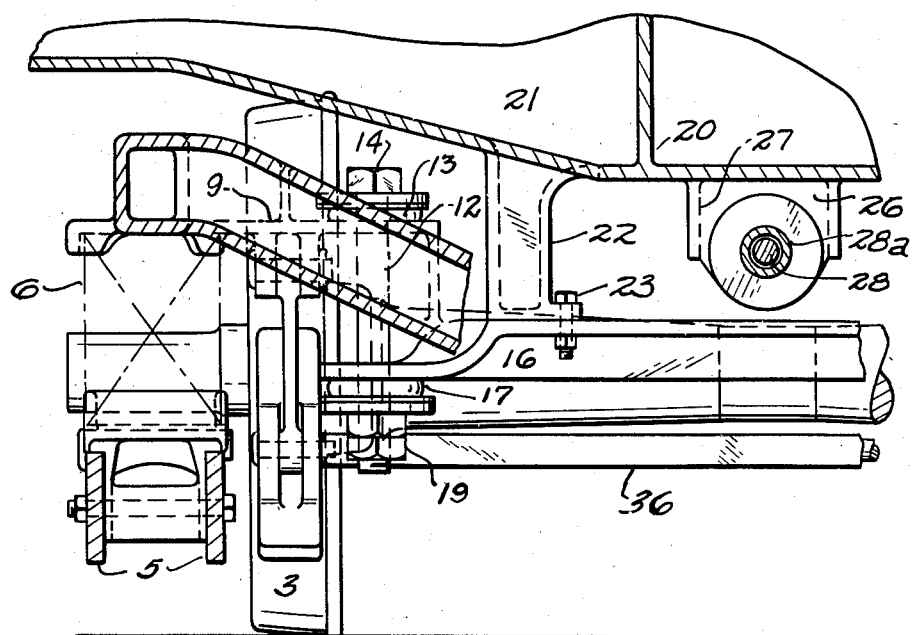
FIG. 4.
INVENTOR.
James C. Travilla
BY
Rodney Bedell
atty.

July 1, 1958     J. C. TRAVILLA     2,841,097
RAILWAY TRUCK

Filed Feb. 24, 1953     3 Sheets-Sheet 3

INVENTOR.
James C. Travilla
BY Rodney Bedell
atty.

United States Patent Office 2,841,097
Patented July 1, 1958

2,841,097

RAILWAY TRUCK

James C. Travilla, University City, Mo., assignor to General Steel Castings Corporation, Granite City, Ill., a corporation of Delaware Application February 24, 1953, Serial No. 338,300

14 Claims. (Cl. 105—199)

This invention relates to railway rolling stock and more particularly to truck structure and the mounting of a vehicle body on the truck structure.

One object of the invention is to obtain relative lateral movement between the vehicle body and the truck to accommodate lateral thrusts resulting from the truck passing from tangent track to curved track or vice versa or resulting from track inequalities, such as uneven rail joints, cross-overs, switches, etc.

Another object is to suspend the vehicle body from the truck by links or hangers which may swing in different directions to accommodate the lateral movement referred to above and also to accommodate swiveling of the truck and body relative to each other.

Another object is to avoid the usual center plate construction and the problems of undue tilting laterally of the vehicle body on the truck and the use of side bearings for preventing such tilting.

Another object is to obtain simplicity and economy in a swiveling, lateral motion truck and body assembly.

These objects are attained by the structure illustrated in the accompanying drawings, in which:

Figure 1 is a top view of one longitudinal half of a four wheel truck with a small part of the central portion of the vehicle body underframe indicated at one end of the truck.

Figure 2 is a longitudinal vertical section and side elevation of the same structure and is taken on the line 2—2 of Figure 1.

Figure 3 is a transverse vertical section taken on the line 3—3 of Figure 1.

Figure 4 is a transverse vertical section taken on the line 4—4 of Figure 1.

Figure 5:
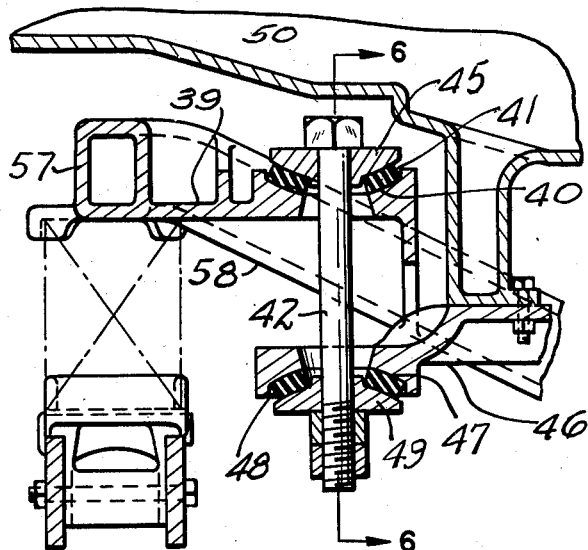
Figure 5 is a detail vertical section taken transversely of the truck through a swing hanger and illustrating another form of the invention.
Figure 6:
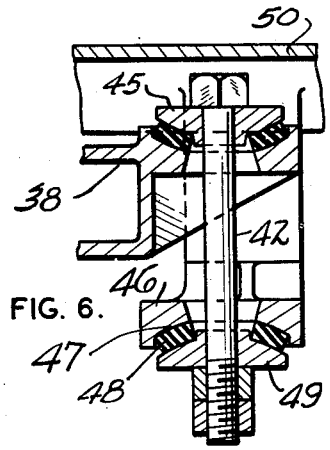
Figure 6 is a detail vertical section taken on the line 6—6 of Figure 5.
Figure 7:
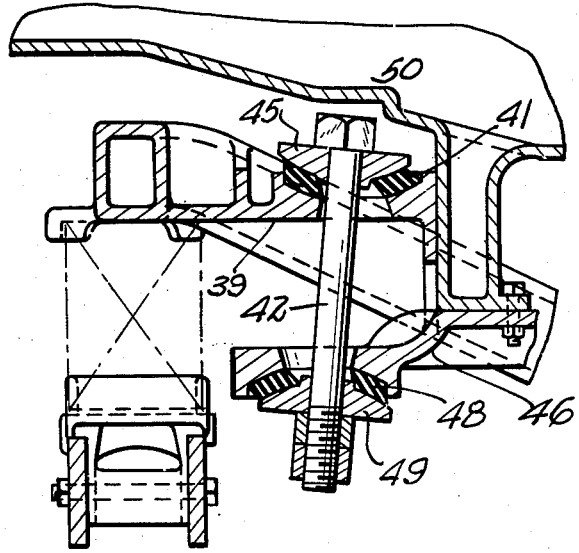

Figure 7 corresponds to Figure 5 but shows the load-carrying beam of Figures 5 and 6 shifted laterally of the truck relative to the truck frame.

The truck includes two axles 1, 2, with wheels 3, and mounting journal boxes 4, which support drop equalizers 5 extending from journal box to journal box at the same side of the truck. Equalizer springs 6 support the truck frame which includes wheel pieces 7, preferably of box-section, connected by an integral transverse center transom 8, preferably of box-section, extending inwardly and downwardly from wheel pieces 7 and at the center portion of the truck being wholly at a substantially lower level than wheel pieces 7.

Gusset-like brackets 9, between wheel pieces 7 and transom 8, extend inwardly from the bottom portions of the wheel pieces 7 and are braced vertically by upright ribs 10 and 11 merging with relatively high and relatively low portions of transom 8. Suspended from each bracket 9 is a bolt-like hanger 12, positioned inboard of the truck from the wheels and frame wheel pieces and equalizers, there being a cushion 13 of rubber-like material between the top of the bracket and the underside of the bolt head 14. The assembly may also include washers or shims 15 between cushion 13 and the bolt head.

Carried by the four hangers 12 is a load-carrying structure here shown as two elongated beams 16 with their ends supported upon cushion 17, washers or shims 18 and bolt nuts 19 corresponding to the similar parts at the upper end of the bolt.

The vehicle body underframe includes a longitudinal sill structure 20 and a transverse bolster structure 21 which is provided with depending projections 22 mounted on beams 16 and detachably secured thereto by bolts 23. Projections 22 are positioned inboard of the truck from hangers 12. An upstanding web 24 on transom 8 extends transversely of the vehicle and is reinforced by ribs 25. The vehicle underframe center sill structure is provided with a corresponding depending web 26 reinforced by ribs 27. Webs 24 and 26 are spaced a substantial distance apart longitudinally of the vehicle and an anchor bolt 28 extends longitudinally of the vehicle through webs 24, 26 and is shouldered near its opposite ends to provide seats for rubber-like cushions 30 and associated washers or collars 31 at the ends of tubular spacer 28a, the cushions bearing against the opposing faces of webs 24, 26. Similar cushions 32 and associated washers 33 are provided at the opposite sides of webs 24, 26 and the assembly is maintained by the head 34 at one end of anchor bolt 28 and nuts 35 at the other end of the anchor bolt.

Anchor 28, 30, 32, 34, 35 holds the truck and body against substantial relative movement longitudinally of the vehicle but readily accommodates relative swinging of hangers 12. Hangers 12 hold the body and truck frame against substantial direct relative vertical movements when carrying the vertical load but permit relative swiveling movement and relative lateral movement of the body and truck as is necessary to accommodate travel of the vehicle on curved track and desirable yielding to transverse thrusts between the body and the truck. Such relative swiveling and lateral movements may be limited by opposing elements on the truck and body respectively as, for example, the upright opposed faces of ribs 11 and projections 22.

A single truss type brake beam 36 is provided for each pair of wheels and is suspended from brackets 37 depending from gusset-like brackets 9 by brake hangers 38 in the usual manner. The brake beams are below the level of body supporting beams 16 and are spaced longitudinally of the truck from the frame center transom 8. Hangers 12 are similarly spaced longitudinally of the truck from center transom 8 and all of these relatively movable parts clear each other.

The lower ends of hangers 12 may swing in any direction from the normal axes of the hangers and thus may move lengthwise, crosswise, and diagonally of the truck. Such movement is accompanied by distortion of the pads under compression. Gravity and the resiliency of the cushions will automatically center or align the body and truck when the disaligning forces are absorbed.

The arrangements shown in Figures 5, 6, and 7 embody the same general arrangement of the truck including a truck frame with wheel pieces 57, center transom 58 and gusset brackets 39. The seat 40 on each bracket, for the cushion 41 supporting the swing hanger 42, is of concave spherical contour and the hanger washer 45 has a correspondingly curved convex face. Similarly the load-carrying beams 46 have concave spherical downwardly facing seats 47 for cushions 48. Washers 49 on the lower ends of hangers 42 are correspondingly curved convexly.

When the vehicle body 50 swings transversely of the truck, or when the truck and body swivel on each other, and hangers 42 are inclined from the normal position indicated in Figures 5 and 6, cushions 41 and 48 distort under shear as indicated in Figure 7 without being subjected to additional compressive forces as are the cushions 13, 17 in the form previously described.

The details of the structure may be varied other than as indicated without departing from the spirit of the invention and the exclusive use of those modifications coming within the scope of the claims is contemplated.

What is claimed is:

1. In a railway vehicle, a truck including axles and wheels and a truck frame carried thereby and including wheel pieces, a vehicle body including an underframe, hangers suspended at their upper ends from said truck frame at the level of said wheel pieces and extending downwardly and below the level of said wheel pieces, and members on said underframe projecting downwardly between hangers at opposite sides of the truck and supported from the lower ends of said hangers.

2. A railway vehicle as described in claim 1 which includes a connector member secured to both the truck and the vehicle body underframe and holding them against substantial relative movement longitudinally of the vehicle.

3. In a railway vehicle truck having wheels and axles, and a truck frame supported thereby and including wheel pieces and a transverse center transom, hangers depending from said frame inboard of the truck from the wheels at opposite sides of said transom, and body support structure rigid with the body and carried by said hangers inboard of the truck from the wheels, said hangers being swingable about their upper ends crosswise, lengthwise and diagonally of the truck.

4. In a railway vehicle, a truck having wheels and axles, equalizers extending between said axles, springs mounted on the equalizers, a frame carried on said springs, hangers suspended from said frame inboard of the truck from said equalizers and springs, and vehicle body underframe brackets carried on said hangers inboard of the truck from said equalizers and springs, the lower ends of said hangers being swingable in any direction from the normal hanger axes.

5. In a railway vehicle truck having wheels and axles, a truck frame spring-supported thereby and including side members and a transverse member extending between and rigid with said side members, hangers suspended from said frame adjacent to the intersection of said side members and transverse member, and swingable crosswise and lengthwise of the truck, a bracket on said transverse member near the center of the truck, and an anchor extending longitudinally of the truck with one end yieldably connected to said bracket and with its other end arranged for yielding connection to a vehicle body.

6. In a railway vehicle truck having wheels and axles, and a truck frame supported thereby and including wheel pieces connected by a transverse transom, there being horizontal gusset-like brackets between said wheel pieces and transom, upright hangers passing through said brackets and each having a head member, there being a cushion of rubber-like material between the gusset and the head, there being upwardly facing shoulders on the lower ends of said hangers, rubber-like cushions supported by said shoulders, transverse beams extending between and receiving the lower end portions of said hangers and supported on said latter-mentioned cushions, and vehicle body supports carried on said beams.

7. A railway vehicle truck as described in claim 6 which includes brake hangers depending from the gussets and swinging longitudinally of the truck, and brake beams extending transversely of the truck and carried by said brake hangers below the level of the body supporting beams.

8. A railway vehicle truck as described in claim 6 in which the opposing surfaces of the cushions and the associated parts have concavo-convex spherical contours and the cushions distort under shear when the hangers swing from their normal position.

9. In a railway vehicle truck including axles and wheels and a truck frame supported therefrom, elongated hangers suspended from the frame, and a body support structure carried on the lower ends of said hangers, cooperating concavo-convex bearing elements of spherical contour connecting one end of each hanger with the associated part, there being a cushion of rubber-like material between said cooperating bearing elements distortable in shear as the hanger swings from its normal axial position.

10. In a railway vehicle truck including axles and wheels and a truck frame supported therefrom, elongated hangers suspended from the frame, and a body support structure carried on the lower ends of said hangers, cooperating concavo-convex bearing elements of spherical contour mounting the upper ends of the hangers on the frame and similar bearing elements mounting the body support structure on the lower ends of said hangers, there being cushions of rubber-like material between the bearing elements at the supported ends of the hangers and between the bearing elements at the swinging ends of the hangers, said cushions being distortable in shear as the hangers swing from their normal axial position and shift said bearing elements transversely of the hanger axis.

11. In a railway vehicle truck having wheels and axles, and a truck frame supported thereby and including wheel pieces and a transverse center transom, brackets extending inwardly from said wheel pieces at opposite sides of said transom and having upright openings, a bolt-like hanger extending downwardly through each opening and having an enlarged head at its upper end, with a downwardly facing spheroidal surface supported by the related bracket, whereby the lower end of the hangers are adapted for swiveling movement transversely and longitudinally of the truck.

12. A railway vehicle truck as described in claim 11, wherein a resilient spacer member is provided between the hanger head and the associated bracket.

13. A railway vehicle truck as described in claim 11, in which there are vehicle body support members extending transversely of the truck and being secured at each end directly to one of said hangers.

14. In a railway vehicle a truck having wheels and axles, a truck frame supported thereby including wheel pieces and a center transverse transom, hangers depending from said frame inwardly of the wheels and extending downwardly below said wheel pieces and transom at opposite sides of the latter, a transverse member and below the level of said frame engaged at its ends to the lower ends of said hangers, a vehicle body including an underframe having spaced downward projecting portions mounted on said transverse members, and a connecting element engaging both said vehicle underframe and truck frame intermediate the downward projecting portions and holding them against relative movement lengthwise of the vehicle.

References Cited in the file of this patent

UNITED STATES PATENTS

| | | |
|---|---|---|
| 1,181,272 | Ward | May 2, 1916 |
| 1,386,851 | Elliott | Aug. 9, 1921 |
| 2,107,296 | Holloway | Feb. 8, 1938 |
| 2,268,267 | Sheesley | Dec. 30, 1941 |
| 2,706,453 | Schneider | Apr. 19, 1955 |